(12) United States Patent
Ree et al.

(10) Patent No.: US 8,472,893 B2
(45) Date of Patent: Jun. 25, 2013

(54) SYSTEM FOR CONTROLLING ANTENNA DIVERSITY IN A HOME AREA NETWORK

(75) Inventors: Bradley Richard Ree, Cumming, GA (US); Matthew J. Farley, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 66 days.

(21) Appl. No.: 13/275,121

(22) Filed: Oct. 17, 2011

(65) Prior Publication Data
US 2013/0095769 A1 Apr. 18, 2013

(51) Int. Cl.
*H04B 7/02* (2006.01)
*H04B 17/00* (2006.01)

(52) U.S. Cl.
USPC ........................................ 455/101; 455/67.11

(58) Field of Classification Search
USPC ................ 455/101, 67.11, 423, 575.7, 562.1, 455/556.1, 66.1, 74, 41.2; 340/870.01, 870.07
See application file for complete search history.

(56) References Cited

U.S. PATENT DOCUMENTS

| | | | |
|---|---|---|---|
| 7,010,661 B2 * | 3/2006 | Kamel et al. | 711/171 |
| 7,774,439 B2 * | 8/2010 | Baek et al. | 709/220 |
| 8,362,918 B2 * | 1/2013 | Choi et al. | 340/870.07 |

* cited by examiner

*Primary Examiner* — Sonny Trinh
(74) *Attorney, Agent, or Firm* — Fletcher Yoder, P.C.

(57) ABSTRACT

A system, in one embodiment, includes an energy services interface having first and second antennas configured to communicate with a home area network (HAN) to receive information related to energy, communication circuitry configured to communicate data using the first and second antennas, and control logic configured to assign the first HAN device to either the first or second antenna as a first assigned antenna based at least partially upon which of the first or second antennas receives a stronger signal when communicating with first HAN device. In addition, the energy services interface is configured to communicate with the first HAN device via the first assigned antenna based on an antenna diversity schedule.

21 Claims, 5 Drawing Sheets

| HAN DEVICE ID | ASSIGNED ESI ANTENNA | COMMUNICATION TIME SLOTS |
|---|---|---|
| 0001 | 1 | 7:00AM; 2:00PM |
| 0002 | 2 | 7:00PM; 2:00AM |
| 0003 | 2 | 7:00PM; 2:00AM |
| 0004 | 1 | 7:00AM; 2:00PM |
| 0005 | 2 | 7:00PM; 2:00AM |
| 0006 | 1 | 7:00AM; 2:00PM |
| 0007 | 1 | 7:00AM; 2:00PM |

FIG. 5

| HAN DEVICE ID | COMMUNICATION TIME SLOTS |
|---|---|
| 0001 | 7:00AM; 2:00PM |

FIG. 6

| HAN DEVICE ID | COMMUNICATION TIME SLOTS |
|---|---|
| 0001, 0004, 0006, 0007 | 7:00AM; 2:00PM |

FIG. 7

SYSTEM FOR CONTROLLING ANTENNA DIVERSITY IN A HOME AREA NETWORK

BACKGROUND OF THE INVENTION

The subject matter disclosed herein relates generally to techniques for monitoring and controlling power usage of electrical devices in a home area network and, more particularly to techniques controlling antenna diversity in a home area network.

With respect to power and energy distribution, a group of one or more electrical devices in given a geographical location, such as a residential house, a group of residential houses, a commercial building, or a group of commercial buildings, that draw power from an energy provider, such as an electrical power company, may be referred to as a home area network. To monitor and/or control energy usage, an energy service interface (ESI) may be provided, which essentially acts as an interface between the home area network and the energy provider. For instance, the ESI may be network-centric and may be configured to communicate with home area network devices using wireless communication technologies. However, because different polarization configurations (e.g., horizontally polarized, vertically polarized, etc.) are available for antenna design, not all of the home area network devices may have the same polarization and, moreover, an antenna of the ESI may have a different polarization from one or more antennas of the home area network. When this is the case, communications between home area network devices having an antenna polarization that does not match the polarization of an antenna of the ESI may experience signal losses, which may prevent the ESI from receiving and/or communicating accurate power usage information. The signal also may reflect off of different surfaces, and combine to cancel the signal at different locations. Thus, a need exists to control spatial diversity.

BRIEF DESCRIPTION OF THE INVENTION

In one embodiment, a system includes an energy services interface having first and second antennas configured to communicate with a home area network (HAN) having at least a first HAN device to receive information related to energy. The energy services interface also includes communication circuitry configured to communicate data using the first and second antennas. The energy services interface also includes control logic configured to assign the first HAN device to either the first or second antenna as a first assigned antenna based at least partially upon which of the first or second antennas receives a stronger signal when communicating with first HAN device. In addition, the energy services interface is configured to communicate with the first HAN device via the first assigned antenna based on an antenna diversity schedule.

In another embodiment, a system includes a plurality of home area network (HAN) devices, wherein each of the HAN devices is configured to communicate information related to energy for a respective electrical device. The system also includes an energy services interface with at least two antennas including first and second antennas, wherein the energy services interface is configured to assign each of the HAN devices to an assigned antenna as one of the at least two antennas having a strongest signal when communicating with an antenna of the HAN device. In addition, the energy services interface is configured to communicate with each of the HAN devices via its assigned antenna based on an antenna diversity schedule.

In another embodiment, a system includes at least one home area network (HAN) device configured to operate in a home area network (HAN), wherein the at least one HAN device is configured to communicate with an energy services interface to exchange information related to energy of at least one electrical device. The at least one HAN device includes an antenna configured to communicate with an assigned antenna of the energy services interface, wherein the assigned antenna is selected from at least two antennas of the energy services interface as one of the at least two antennas having a strongest signal when communicating with the antenna of the at least one HAN device. In addition, the at least one HAN device is configured to communicate with the energy services interface via the assigned antenna based on an antenna diversity schedule.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 depicts an example of an antenna diversity communication schedule that may be the result of the process of FIG. 4;

FIG. 6 represents communication scheduling information that may be transmitted from the energy services interface to a home area network device;

FIG. 7 represents communication scheduling information that may be transmitted from the energy services interface to a home area network device.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
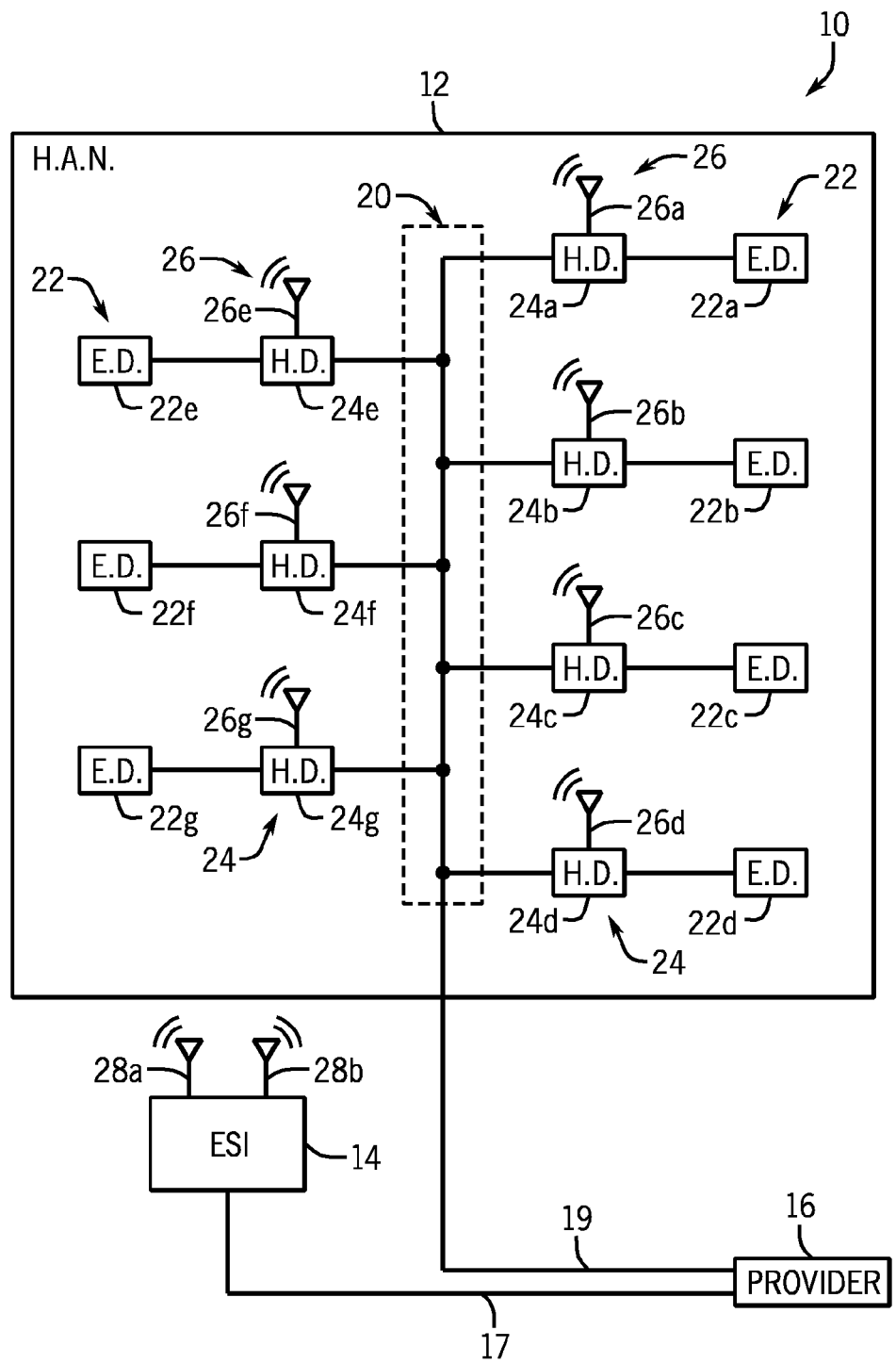
FIG. 1 is a block diagram depicting a system that includes a home area network (HAN) having multiple HAN devices and an energy services interface (ESI), in accordance with an embodiment of the present invention.

FIG. 1 illustrates a system 10 having a home area network (HAN) 12, an energy services interface (ESI) 14, and a utility provider 16, in accordance with an embodiment of the present invention. As discussed below, the system 10 may be configured to control antenna diversity with respect to communications between the devices of the home area network 12 and the ESI 14. The HAN 12 may include a power distribution network 20 that may supply power provided by the utility provider 16 (via power transmission lines 19) to a number of electrical devices 22. For instance, as shown in FIG. 1, each electrical device 22a-22g is connected to the power distribution network 20 through a respective home area network device 24a-24g (a "HAN device"). Accordingly, each electrical device 22a-22g may be powered using power provided to the power distribution network 20 by the utility provider 16. By way of example, the HAN 12 may represent one or more residential buildings (e.g., a house, apartment, etc.) or one or more commercial buildings (e.g., office building, retail complex, etc.). As can be appreciated, any number of HAN devices 24 and electrical devices 22 may be present.

The ESI 14 may be network-centric device providing energy metering functionality. In the present embodiment, each of the HAN devices 24 may monitor and track energy usage for a respective electrical device 22. By way of example, the electrical devices 22a-22g illustrated in FIG. 1 may represent any type of device that is powered by electricity, such as an air conditioning system, an electrical heater, a refrigerator or freezer, a laundry machine (e.g., a washer and/or dryer), a dishwasher, a cooking appliance (e.g., oven, cook top, microwave, etc.), audio/video equipment (e.g., television, audio/video receiver, audio or video disc player, audio or video streaming device, etc.), a computer, or any other type of electrical device or appliance. The energy usage data for each electrical device 22 within the home area network 12 may then be transmitted to the ESI 14 periodically. For instance, each HAN device 24 may include communication circuitry configured to wirelessly transmit and receive data via an antenna 26. As discussed in further detail below, the transmission of energy information (e.g., information relating to energy) from the HAN devices 24 to the energy services interface 14 may be performed using a scheduling technique based on antenna diversity (e.g., an antenna diversity schedule). In certain embodiments, the energy information (e.g., information relating to energy) may include energy usage information relating to usage of energy by one or more devices, energy pricing information (e.g., real time pricing from a utility), load control information relating to the control of one or more loads, load status information relating to the status of one or more loads, control or action messages to one or more load control devices configured to control power of one or more devices (e.g., to enable power, disable power, or change power settings of the devices), confirmation messages (e.g., to confirm receipt of a control message or another message), a device status message, a user acknowledgment message, or any combination thereof. Accordingly, as used herein, the term "energy information" may include a variety of information generally relating to energy. The energy information (e.g., information relating to energy) may then be provided from the ESI 14 to the utility provider 16. For instance, in some embodiments, a technician employed by the utility provider 16 may retrieve the energy information from the ESI 14 directly, such as by taking readings from one or more analog and/or digital meters and/or by downloading the energy information from the ESI 14 to another device, such as a laptop computer, tablet computer, mobile phone, personal digital assistant, and so forth. In other embodiments, such as the embodiment shown in FIG. 1, the ESI 14 may transmit the energy information directly to the provider 16, as indicated by communication path 27.

As shown in FIG. 1, the energy services interface 14 may include multiple antennas, such as the antennas 28a and 28b, configured to receive the energy information (e.g., information relating to energy usage, pricing, loads, control, messages, etc.) transmitted by the antennas 26 of the HAN devices 24. For instance, as described in further detail below, each HAN device 24 may be assigned to communicate with a particular antenna (e.g., antenna 28a or 28b) based on a scheduling process that may be performed by the ESI 14. Further, the ESI 14 and the HAN devices 24 may communicate using any suitable type of wireless communication standard, such as via wireless local area networking technologies (e.g., in accordance with IEEE 802.11 standards), cellular networking technologies (e.g., EDGE, 3G, 4G, HSPA, HSPA+, LTE, WiMax, etc.), Bluetooth, Ultra-wideband, ZigBee (e.g., IEEE 802.15.4-2003), radio frequency (RF), and so forth.

As discussed above, in communications systems that do not implement an antenna diversity scheme, signal quality may be significantly degraded under certain conditions, such as if the communicating antennas have different polarizations and/or when there is no clear line-of-sight (LOS) between the transmitting and receiving antennas. In the latter case, an RF signal is reflected along multiple paths before finally being received by a receiving antenna. Each of these bounces can introduce phase shifts, time delays, attenuations, and/or distortions that can destructively interfere with one another at the aperture of the receiving antenna. In either case, when an antenna mismatch occurs, the result may be degraded signal quality in the transmitted data. As can be appreciated, this may prevent the ESI from communicating accurate and/or complete energy information (e.g., information relating to energy usage, pricing, loads, control, messages, etc.) with the utility provider 16.

To implement antenna diversity, one embodiment of the ESI 14 may be configured to implement polarization diversity by having the antennas 28a and 28b configured in different orthogonal polarizations. For instance, the antenna 28a may be configured as a vertically polarized antenna and the antenna 28b may be configured as a horizontally polarized antenna, or vice versa. Thus, in one such embodiment, the ESI 14 may be configured to determine the polarization of the antennas 26a-26g of each of the HAN devices 24a-24g, and to implement a schedule such that all horizontally polarized HAN devices 24 communicate to the horizontally polarized antenna (e.g., 28b) of the ESI 14 during a first time slot and all vertically polarized HAN devices 24 communicate with the vertically polarized antenna (e.g., 28a) of the ESI 14 during a second time slot. For example, in some instances where the communicating antennas are mismatched, i.e., when a vertically polarized antenna communicates with a horizontally polarized antenna, as much as 60 dB or more of signal strength may be lost.

In a further embodiment, the ESI 14 may be configured to implement spatial diversity. In such an embodiment, multiple antennas having the same polarization are provided, such as antennas 28a and 28b, and are positioned at different spatial locations. Further, the antennas 26 of the HAN devices 24 may also have the same polarization as the antennas 28a and 28b. As discussed above, obstructions in line-of-sight, such as by buildings, trees, walls, and other physical items, may cause the signal from the antennas to be blocked or reflected. Thus, spatial diversity may address the material nulls in radiation patterns that are typically found in real-world applications. For instance, in a spatial diversity configuration, the ESI 14 initially uses both antennas 28a and 28b to communicate with each HAN device 24. The antenna 28a or 28b that responds to the strongest signal from a given HAN device 24 is then assigned to that HAN device 24. For instance, if an RF signal transmitted from HAN device 24a via antenna 26a to antenna 28a of the ESI 14 exhibits a stronger signal quality compared to an RF signal transmitted from antenna 26a to antenna 28b of the ESI 14, then the HAN device 24a is assigned to communicate with the antenna 28a during scheduled communication time slots. The various techniques relating to implementing antenna diversity in the system 10 of FIG. 1 are described in further detail below.

Figure 2:
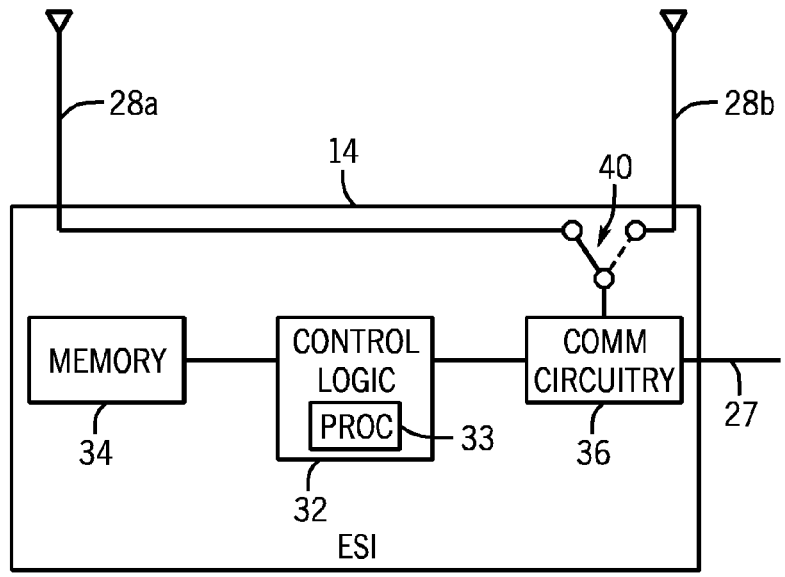
FIG. 2 is more detailed view of the energy services interface shown in FIG. 1, in accordance with one embodiment of the present invention.

FIG. 2 is a block diagram depicting a more detailed view of the energy services interface 14, in accordance with an embodiment of the present invention. The functional blocks depicted in FIG. 2 may include hardware elements (e.g., circuitry), software elements (e.g., computer code stored on computer-readable media, such as a hard drive or system memory), or a combination of both hardware and software elements. As shown, the ESI 14 may include control logic 32, processor 33, memory device 34, and communication circuitry 36. The control logic 32, which may include the processor 33, may generally be configured to control the functions of the ESI 14. For instance, the processor 33 may provide the processing capability to execute an antenna diversity scheduling algorithm, to compile and/or aggregate energy information (e.g., energy usage information) received from the HAN device 24 for transmission to the provider 16, and any other functions of the ESI 14. For instance, in some embodiments, the ESI 14 may provide security and/or coordination functions that enable secure interactions between relevant HAN devices and the utility provider 16. Additionally, the ESI 14 may provide additional functions, such as remote load control, monitoring and control of distributed generation, in-home display of customer usage, reading of non-energy meters (e.g., water, gas, etc.), and integration with building and/or home management systems. In the illustrated embodiment, the processor 33 may include one or more microprocessors, such as one or more general-purpose microprocessors, application-specific microprocessors (ASICs), or a combination of such processing components.

The communication circuitry 36 may operate as a transceiver. That is, the communication circuitry may be configured to provide for both transmitting and receiving functions. For instance, the communication circuitry 36 may receive (by way of antenna 28a or 28b) energy usage data transmitted by the HAN device 24. Additionally, when configuring an antenna diversity communication schedule, the communication circuitry 36 may transmit scheduling information to the HAN devices 24. Additionally, as shown in FIG. 2, the communication circuitry 36 may also be configured to provide energy information (e.g., energy usage information) to the utility provider 16 via the communication path 27.

The memory device 34 may include volatile memory, such as random access memory (RAM), or non-volatile memory, such as read-only memory (ROM), hard disk drive, or flash memory, or a combination of RAM and ROM devices. Energy information (e.g., energy usage information) obtained by the ESI 14 from the HAN devices 24 may be compiled and stored in the memory device 34 and later transmitted to the utility provider 16, or may be retrieved from the memory device 34 by a technician employed by the utility provider 16. The instructions or data to be processed by the processor 33, which may include instructions for determining an antenna diversity communication schedule, may be stored in the memory device 34. By way of example, to generate such a communication schedule, the ESI 14 may initially communicate with each HAN device 24 using both of the antennas 28a and 28b. The ESI 14 may determine which antenna 28a or 28b communicates with the HAN device 24 with the stronger signal, and may assign each HAN device 24 to the antenna (28a or 28b) of the ESI 14 that responds to the stronger signal. Then, the ESI 14 may establish an antenna diversity schedule by scheduling one or more time slots in which HAN devices 24 assigned to one antenna, such as antenna 28a, communicate energy information (e.g., energy usage information) to the ESI 14, and scheduling one or more other time slots in which HAN devices 24 assigned to the other antenna, such as antenna 28b, communicate energy information (e.g., energy usage information) to the ESI 14. For instance, assigning the HAN devices 24 to a particular antenna 28a or 28b of the ESI 14 may include transmitting determined scheduling information to each of the HAN devices, as discussed further below.

As further shown in the present embodiment, the ESI 14 may include a switching device or switch 40. The switching device 40 may represent any suitable type of switch, such as a mechanical switch, an electrical switch (e.g., such as a solid state transistor (e.g., MOSFET)), or an RF switch. Accordingly, communication between the ESI 14 and the HAN devices 24 may occur through either of antenna 28a or antenna 28b depending on the position of the switch 40. For instance, in a first position, which is shown in FIG. 2, communications to and from the ESI 14 may occur through antenna 28a, while in a second position (shown in phantom in FIG. 2), communications to and from the ESI 14 may occur through antenna 28b.

Figure 3:
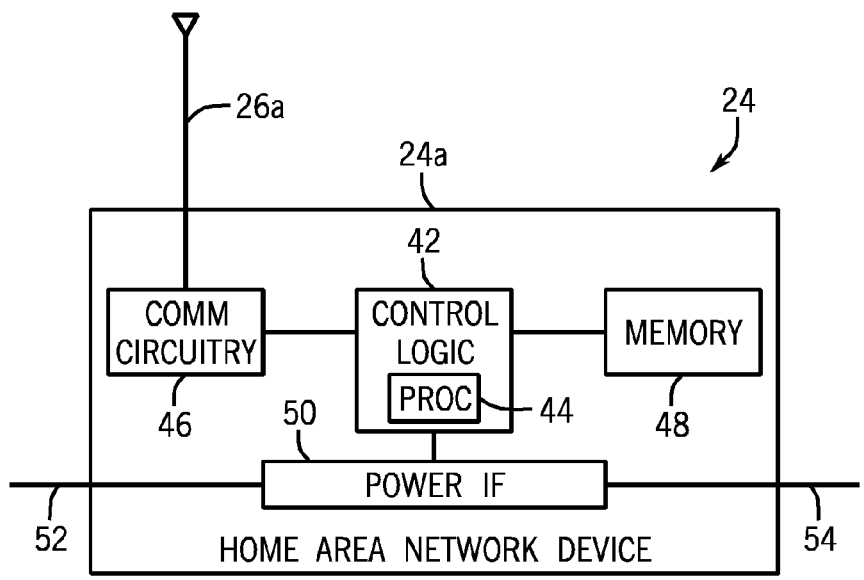
FIG. 3 is a more detailed view of a home area network device, as shown in FIG. 1, in accordance with one embodiment of the present invention.

Referring now to FIG. 3, a block diagram depicting a more detailed view of a HAN device 24 is illustrated, in accordance with an embodiment of the present invention. Specifically, FIG. 3 is intended to show a more detailed view of the HAN device 24a of FIG. 1, although it should be understood that all of the HAN devices 24a-24g may generally be configured in this manner.

Like FIG. 2, the functional blocks depicted in FIG. 3 may include hardware elements (e.g., circuitry), software elements (e.g., computer code stored on computer-readable media, such as a hard drive or system memory), or a combination of both hardware and software elements. As shown, the HAN device 24a may include control logic 42, processor 44, communication circuitry 46, memory device 48, and power interface 50. The control logic 42, which may include the processor 44, may generally be configured to control the functions of the HAN device 24a. For instance, the processor 44 may provide the processing capability to execute an energy usage monitoring application for tracking energy usage of a respective electrical device (e.g., 22a) connected to the HAN device 24a. As can be appreciated, such an application may be configured to track energy usage over time, and to determine a quantity of energy usage over a particular amount of time, e.g., kilowatt hours. The processor 44, in conjunction with communication circuitry 46 and antenna 26a, may also be configured to establish periodic communication with the ESI 14 based upon the above-mentioned antenna diversity communication schedule in order to transmit energy information (e.g., energy usage information) of the electrical device 22a to the ESI 14. In the illustrated embodiment, the processor 44 may include one or more microprocessors, such as one or more general-purpose microprocessors, application-specific microprocessors (ASICs), or a combination of such processing components.

The communication circuitry 46 may operate as a transceiver configured to provide for both transmitting and receiving functions. For instance, the communication circuitry 46 may receive (by way of antenna 26*a*) antenna diversity scheduling information from the ESI 14. The communication circuitry 46 of the HAN device 24*a* may then transmit energy information (e.g., energy usage information) to the ESI 14 in accordance with the scheduling information. Again, as discussed above, the communication between the ESI 14 and HAN device 24*a* may utilize any type of wireless communication standard, such as an 802.11a/b/g/n wireless LAN standard, ZigBee, and so forth.

The memory device 48 may include volatile memory, such as random access memory (RAM), or non-volatile memory, such as read-only memory (ROM), hard disk drive, or flash memory, or a combination of RAM and ROM devices. Energy information (e.g., information relating to energy usage, pricing, loads, control, messages, etc.) corresponding to a respective electrical device (e.g., 22*a*) may be stored in the memory 48 for transmission to the ESI 14 during scheduled communication time slots. Additionally, the embodiment of the HAN device 24*a* shown in FIG. 3 also includes the power interface 50. Essentially, the power interface 50 connects the HAN device 24*a* to the power distribution network 20 (by connection 52) and to the electrical device 22*a* (by connection 54). The power interface 50 allows power from the power distribution network 20 to be provided to the electrical device 22*a* and, at the same time, may also power the HAN device 24*a* while enabling the control logic 42 to monitor power usage of the electrical device 22*a*.

Figure 4:
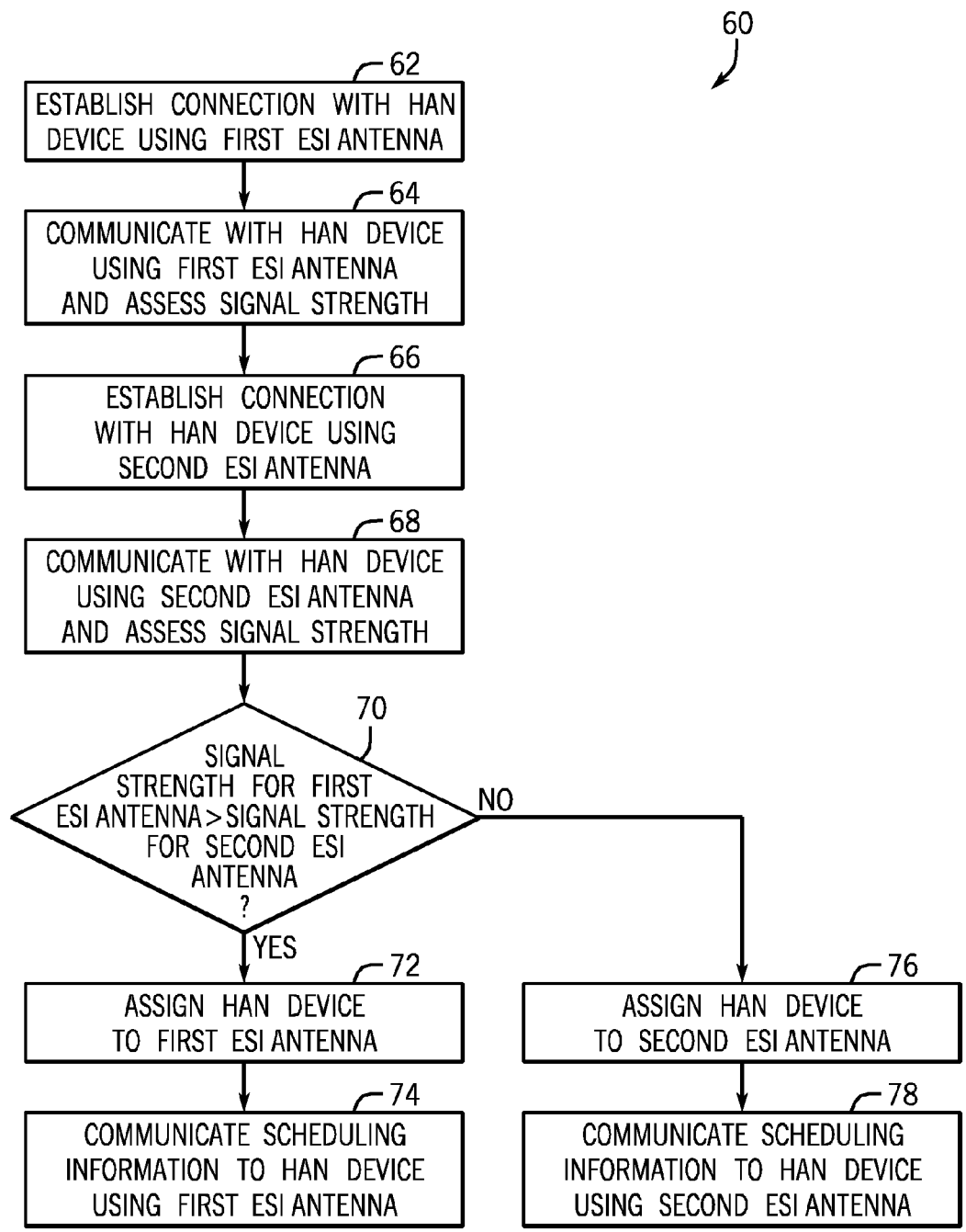
FIG. 4 is a flow chart depicting a process for determining an antenna diversity communication schedule for a home area network, in accordance with an embodiment of the present invention.

With these points in mind, FIG. 4 is a flow chart that illustrates a process 60 for determining an antenna diversity communication schedule for a HAN device 24, in accordance with an embodiment. The process 60 may be performed by the ESI 14, and may be repeated for each HAN device 24 to determine the communication schedule. Once the schedule is determined, communications between the HAN devices 24*a*-24*g* and the ESI 14 are carried out in accordance with the schedule.

As shown, the process 60 begins at step 62 where the ESI 14 establishes a connection with a HAN device using a first ESI antenna 28*a*. For instance, in this step 62, the switch 40 discussed above in FIG. 2 may be controlled such that communications to and from the ESI 14 occur via the antenna 28*a*. Next, at step 64, the ESI 14 communicates with the HAN device 24 using the first antenna 28*a*, and the signal strength of the RF signal received by the antenna 28*a* is assessed. In this step, the communication may include energy information (e.g., information relating to energy usage, pricing, loads, control, messages, etc.), or may contain test data (e.g., dummy data) used solely for determining signal strength. Thereafter, steps 66 and 68 are performed by the ESI. These steps are generally similar to steps 62 and 62, respectively, except that the communication is performed using the second antenna 28*b* of the ESI. For instance, this may include controlling the switch 40 to a second position such that communications to and from the ESI 14 occur via the antenna 28*b*.

A comparison of the signal strength of the RF signals received by the two antennas 28*a* and 28*b* is then made at decision logic 70. If the signal strength of the RF signal received by the first antenna 28*a* is greater than that of the second antenna 28*b*, then the process 60 continues to step 72, and the HAN device 24 is assigned to communicate to the first antenna 28*a*. At step 74, the scheduled communication time slots are transmitted to the HAN device 24 using the first antenna 28*a*. If it is determined at decision logic 70 that the RF signal sent to the ESI 14 from the HAN device 24 exhibits greater signal strength with respect to the second antenna 28*b*, then the process 60 continues to step 76, and the HAN device 24 is assigned to communicate to the second antenna 28*b*. At step 78, the scheduled communication time slots are transmitted to the HAN device 24 using the second antenna 28*b*.

In one embodiment, each HAN device 24 may have a unique identifier, so that the ESI 14 may distinguish between the various HAN devices 24 in the home area network 12. Accordingly, the transmitted assignment and scheduling information (step 74 or 78) may also include the identifier of the HAN device 24, so that the transmitted assignment and scheduling information is received and stored only by the corresponding HAN device 24. Additionally, the ESI 14 may transmit timing information, such that the HAN device 24 may synchronize an internal clock with the ESI 14. As can be appreciated, the process 60 may initially be repeated for each HAN device 24 in the home area network 12 until all of the HAN devices 24 are assigned and scheduled.

As discussed above, the process 60 described in FIG. 4 may implement an antenna diversity control algorithm. For instance, in one embodiment, the control algorithm (which may include assignment and scheduling) may be based on polarization diversity, and one antenna of the ESI 14, such as antenna 28*a*, may be vertically polarized while the other antenna of the ESI 14, such as antenna 28*b*, may be horizontally polarized. Likewise, the antennas 26 of the HAN devices 24 may be configured as either horizontally or vertically polarized antennas. The scheduling algorithm depicted in FIG. 4 thus attempts to assign vertically polarized HAN devices 24 to communicate with the vertically polarized antenna 28*a* of the ESI 14 and assign horizontally polarized HAN devices 24 to communicate with the horizontally polarized antenna 28*b* of the ESI 14.

FIG. 5 is example of an antenna diversity communication schedule 80 that may be obtained after performing the process 60 of FIG. 4. For instance, the schedule 80, which may be stored in the memory 34 of the ESI 14, may include a number of entries, each of which may correspond to a respective one of the HAN devices 24*a*-24*g*. Each HAN device 24*a*-24*g* may have a unique identifier. For instance, in the present example, the HAN device 24*a* may have an identifier "0001" and may be assigned to the first ESI antenna, i.e., antenna 28*a*. HAN device 24*b* may correspond to identifier "0002", HAN device 24*c* may correspond to identifier "0003," and so forth.

As indicated by the schedule, the HAN device 0001 will communicate with the ESI 14 at the time slots 7:00 AM and 2:00 PM. Similarly, the HAN device 24*b*, having the identifier "0002," may be assigned to the second ESI antenna, i.e. antenna 28*b*, and scheduled to communicate with the ESI 14 at the time slots 7:00 PM and 2:00 AM. Thus, in this example, the HAN devices 24 represented by the identifiers "0001", "0004", "0006", and "0007" have been determined to have vertically polarized antennas, and the HAN devices 24 represented by the identifiers "0002", "0003", and "0005" have been determined to have horizontally polarized antennas. For instance, this may be determined by comparing the signal strength of communications on both antennas of the ESI 14. When a mismatch in antenna polarization occurs, a noticeable drop in signal strength is typically seen and may be as much as a 60 dB or more loss in signal strength. Thus, based on this analysis, the ESI 14 may determine which HAN devices 24 have vertically polarized antennas and which HAN devices 24 have horizontally polarized antennas and assign the HAN devices accordingly. While only two time slots are shown for each antenna 28a, 28b in the example of FIG. 5, it should be appreciated that the antennas may be scheduled to receive energy usage updates from the HAN devices more or less frequently in other embodiments, with the understanding that only one of the antennas 28a, 28b of the ESI 14 is active at a given time (e.g., time slots for antenna 28a and antenna 28b do not coincide or overlap).

With respect to the transmission of the scheduling information to a HAN device 24, FIG. 6 provides an example of the type of information that may be transmitted from the ESI 14 to a HAN device 24 once antenna assignment and communication scheduling information is determined. As shown in FIG. 6, the scheduling information 86 transmitted by the ESI 14 may include the HAN device identifier, as well as the scheduled communication time slots. Thus, while all HAN devices 24 in the home area network 12 may receive the scheduling information 86, only the HAN device 24 with a matching identifier will recognize itself as being the intended recipient, while all other HAN devices 24 will disregard the transmission. As can be appreciated, the assigned antenna information need not be transmitted to the HAN device 24, as the HAN device merely needs to know when to transmit energy usage updates. It is the ESI 14 that activates the appropriate antenna 28a or 28b for receiving the updates during the scheduled communication time slots. The received scheduling information 86 may be stored in the memory 48 of the HAN device 24.

In another embodiment, the process 60 may be modified such that antenna assignments for all of the HAN devices 24a-24g are first determined before scheduling information is transmitted to the HAN devices 24a-24g. For instance, in such an embodiment, a single transmission 88 may be sent identifying all HAN devices 24 assigned to a particular antenna, as shown in FIG. 7. In this embodiment, the scheduling information 88 may be received by any HAN device having an identifier that matches one of the identifiers sent in the transmission 88. As can be appreciated, this may reduce the total number of transmissions from the ESI 14 needed to establish the communication schedule. Further, in yet another embodiment, the HAN device 24 may report its antenna polarization characteristics to the ESI 14. In such an embodiment, the process 60 may omit the decision logic 70, and a communication with only one of the antennas 28a or 28b may be sufficient, provided the polarization information is received by the ESI 14 via the communication.

As discussed above, another type of antenna diversity that may be utilized in the system 10 of FIG. 1 may be spatial diversity. In such embodiments, the antennas 26 of the HAN device 24 and the antennas 28a and 28b of the ESI 14 may all have the same polarization. However, natural nulls in radiation pattern, which may be the result of RF signals being blocked and/or reflected off objects in the line-of-sight between the communicating antennas, such as trees, walls, buildings, or other physical objects, may affect the RF signal being transmitted between the antennas. For instance, each reflection or bounce may introduce phase shifts, time delays, attenuations, and/or distortions that may destructively interfere with one another at the aperture of the receiving antenna. Thus, despite having the same polarization, the physical location of the antennas and the impact of any objects within the line-of-sight between the antennas may affect signal quality.

To implement spatial diversity, the antennas 28a and 28b of the ESI 14 may be placed at separate spatial locations on the ESI 14. For example, referring to FIG. 2, the antennas 28a and 28b may be spaced apart by between approximately 4 to 24 inches or, more specifically, between approximately 5 to 12 inches, or even more specifically, between approximately 6 to 8 inches. By further example, the antennas 28a and 28b may be spaced apart by a sufficient distance to provide at least approximately 10, 15, 20, 25, or 30 db isolation or more. The antennas of the ESI 14 and of the HAN devices 24 may be configured to operate at 2.4 GHz in some embodiments. Further, in a spatial diversity embodiment, the process 60 of FIG. 4 may similarly be applied by the ESI 14. Here, instead of being based on antenna polarization, the antenna of the ESI 14 that is at a spatial location that receives the strongest signal from a particular HAN device 24 will be assigned to that HAN device. Moreover, it should be noted that in other embodiments that implement spatial diversity, more than two antennas may be provided. For instance, in some embodiments, the ESI 14 may include anywhere from 2 to 5 or more antennas.

As can be appreciated, antenna diversity may be quite effective at mitigating multi-path situations. This is because multiple antennas offer a receiver (e.g., the ESI 14) several observations of the same signal, and each antenna will experience a different interference environment. Thus, if one antenna is experiencing a weakened or degraded signal, it is likely that another antenna is receiving a stronger signal. Further, while polarization and spatial diversity schemes have been described, additional embodiments may also utilize one or a combination of other diversity schemes, such as pattern diversity and/or transmit/receive diversity techniques.

Figure 8:
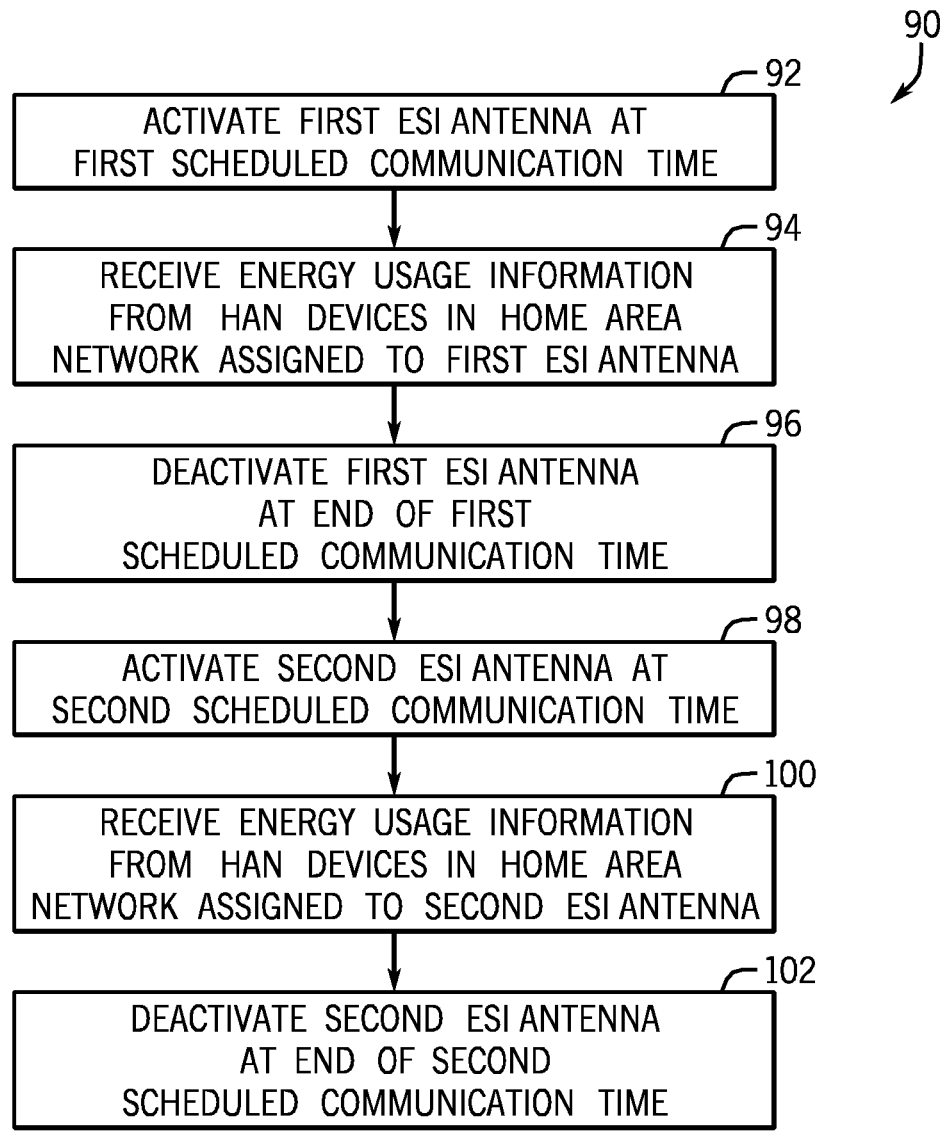
FIG. 8 is a flow chart depicting an embodiment of a process for exchanging energy information (e.g., information relating to energy usage, pricing, loads, control, messages, etc.) between home area network devices and an energy services interface in accordance with an antenna diversity communication schedule.

Referring now to FIG. 8, a flow chart depicting a process 90 by which the ESI 14 may receive energy information (e.g., information relating to energy usage, pricing, loads, control, messages, etc.) updates from the HAN devices 24 in accordance with the antenna diversity communication schedule (e.g., 80) is illustrated in accordance with an embodiment of the present invention. As shown, the process 90 begins at step 92, wherein a first ESI antenna, such as antenna 28a, is activated at a first scheduled communication time. For instance, referring to FIG. 5, one communication time slot for the antenna 28a may be at 7:00 AM. Further, since the HAN devices 24 corresponding to identifiers 0001, 0004, 0006, and 0007 are also scheduled to transmit energy information (e.g., energy usage information) at 7:00 AM, the transmitted energy information (e.g., energy usage information) is received by the antenna 28a, as indicated at step 94. Once all energy usage updates for the communication slot (7:00 AM) are received, the ESI 14 deactivates the antenna 28a, as indicated at step 96.

Thereafter, steps 98-102 are generally similar to steps 92-96, but are performed with respect to the second antenna 28b of the ESI. For instance, at step 98, the second antenna 28b is activated at a second scheduled communication time. For instance, referring to FIG. 5, one communication time slot for the antenna 28b may be at 7:00 PM. Further, since the HAN devices 24 corresponding to identifiers 0002, 0003, and 0005 are also scheduled to transmit energy information (e.g., energy usage information) at 7:00 PM, the transmitted energy information (e.g., energy usage information) is received by the antenna 28b, as indicated at step 100. Once all energy usage updates for the communication slot at 7:00 PM are received by the antenna 28b, the ESI 14 deactivates the antenna 28b, as indicated at step 102. Thereafter, the ESI 14 may wait until the next communication time slot to activate either the first or second antenna 28a, 28b.

Technical effects of the embodiments described above relate to improved RF coverage and higher-bandwidth when compared to single-antenna ESI systems. As will be understood, the various techniques described above and relating to antenna diversity control in a home area network are provided herein by way of example only. Accordingly, it should be understood that the present disclosure should not be construed as being limited to only the examples provided above. Further, it should be appreciated that the above-discussed techniques may be implemented in any suitable manner, including hardware (e.g., suitably configured circuitry), software (e.g., via a computer program including executable code stored on one or more tangible computer readable medium), or via using a combination of both hardware and software elements. Thus, the term "code," as used herein, may refer to machine-readable code (e.g., readable by a computer and/or processor) that may be stored in a machine-readable storage medium (e.g., disk, hard drive, optical drive, flash memory, etc.) for execution by a processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an energy services interface comprising:
first and second antennas configured to communicate with a home area network (HAN) having at least a first HAN device to receive information related to energy;
communication circuitry configured to communicate data using the first and second antennas; and
control logic configured to assign the first HAN device to either the first or second antenna as a first assigned antenna based at least partially upon which of the first or second antennas receives a stronger signal when communicating with first HAN device, wherein the energy services interface is configured to communicate with the first HAN device via the first assigned antenna based on an antenna diversity schedule.

2. The system of claim 1, wherein the energy services interface is configured to transmit communication scheduling information from the energy services interface to the first HAN device using the first assigned antenna, and the communication scheduling information is based on the antenna diversity schedule.

3. The system of claim 2, wherein the communication scheduling information comprises a unique identifier corresponding to the first HAN device, and any other HAN device in the home area network that does not correspond to the unique identifier disregards the communication scheduling information.

4. The system of claim 2, wherein the communication scheduling information comprises a first set of one or more time slots for transmission of the information related to energy from the first HAN device to the energy services interface.

5. The system of claim 4, wherein the energy services interface is configured to communicate the information related to energy with a utility provider.

6. The system of claim 1, wherein the control logic is configured assign a second HAN device of the HAN to either the first or second antenna as a second assigned antenna based at least partially upon which of the first or second antennas receives a stronger signal when communicating with second HAN device, wherein the energy services interface is configured to communicate with the second HAN device via the second assigned antenna based on the antenna diversity schedule.

7. The system of claim 6, comprising at least one of the first or second HAN devices.

8. The system of claim 6, wherein the antenna diversity schedule is configured to schedule a first set of one or more time slots for communications between the first HAN device and the first assigned antenna and a second set of one or more time slots for communications between the second HAN device and the second assigned antenna.

9. The system of claim 8, wherein the first set of one or more time slots and the second set of one or more time slots do not overlap or coincide.

10. The system of claim 1, wherein the first antenna comprises a vertically polarized antenna and the second antenna comprises a horizontally polarized antenna, and wherein the first HAN device is assigned to the vertically polarized antenna or the horizontally polarized antenna based at least partially on the polarization of an antenna of the first HAN device.

11. The system of claim 1, wherein the first antenna and the second antenna are disposed at different spatial locations on the energy services interface.

12. The system of claim 1, wherein the home area network comprises a power distribution network configured to distribute power to at least one electrical device through the first HAN device.

13. The system of claim 1, wherein the information related to energy comprises energy usage information, energy pricing information, load control information, a control message, an acknowledgement message, a device status message, a user acknowledgment, or any combination thereof.

14. A system comprising:
a plurality of home area network (HAN) devices, wherein each of the HAN devices is configured to communicate information related to energy for a respective electrical device; and
an energy services interface comprising at least two antennas including first and second antennas, wherein the energy services interface is configured to assign each of the HAN devices to an assigned antenna as one of the at least two antennas having a strongest signal when communicating with an antenna of the HAN device, wherein the energy services interface is configured to communicate with each of the HAN devices via its assigned antenna based on an antenna diversity schedule.

15. The system of claim 14, wherein, after each HAN device is assigned to the assigned antenna, the energy services interface is configured to transmit communication scheduling information to the HAN device based on the antenna diversity schedule.

16. The system of claim 14, wherein each HAN device is configured to transmit the information related to energy for a respective electrical device to its assigned antenna of the energy services interface at times defined by the communication scheduling information.

17. The system of claim 14, wherein, after all of the HAN devices are assigned to the assigned antennas, the energy services interface is configured to send a first transmission containing communication scheduling information to all HAN devices assigned to the first antenna simultaneously and send a second transmission containing communication scheduling information to all HAN devices assigned to the second antenna simultaneously.

18. The system of claim 14, wherein the first antenna comprises a vertically polarized antenna and the second antenna comprises a horizontally polarized antenna, and wherein each HAN device is assigned to either the first or second antenna depending at least partially on the polarization of the antenna of the HAN device.

19. The system of claim 14, wherein the first antenna, the second antenna, and the antenna of each HAN device have the same polarization, and wherein the first and second antennas are positioned at different locations on the energy services interface to implement a spatial diversity scheme.

20. A system comprising:
at least one home area network (HAN) device configured to operate in a home area network (HAN), wherein the at least one HAN device is configured to communicate with an energy services interface to exchange information related to energy of at least one electrical device, the at least one HAN device comprises an antenna configured to communicate with an assigned antenna of the energy services interface, the assigned antenna is selected from at least two antennas of the energy services interface as one of the at least two antennas having a strongest signal when communicating with the antenna of the at least one HAN device, and the at least one HAN device is configured to communicate with the energy services interface via the assigned antenna based on an antenna diversity schedule.

21. The system of claim 20, comprising the energy services interface having the at least two antennas configured with polarization diversity, spatial diversity, pattern diversity, or a combination thereof.

* * * * *